United States Patent [19]
Paul et al.

[11] Patent Number: 5,584,207
[45] Date of Patent: Dec. 17, 1996

[54] INTEGRATED DRIVE SYSTEM

[75] Inventors: D. Scott Paul, Fort Collins; Robert W. Luffel, Greeley, both of Colo.

[73] Assignee: Hewlett-Packard Company, Palo Alto, Calif.

[21] Appl. No.: 407,541

[22] Filed: Mar. 20, 1995

[51] Int. Cl.⁶ .............................. B66D 3/20; F16H 57/02; F16D 3/06
[52] U.S. Cl. .................. 74/89.22; 29/469; 74/421 A; 74/505; 74/606 R; 254/342; 464/39
[58] Field of Search ............................. 29/469; 74/89.22, 74/421 A, 505, 606 R; 254/342; 464/39

[56] References Cited

U.S. PATENT DOCUMENTS

| | | | |
|---|---|---|---|
| 4,998,232 | 3/1991 | Methlie et al. | 369/36 |
| 5,010,536 | 4/1991 | Wanger et al. | 369/36 |
| 5,014,255 | 5/1991 | Wanger et al. | 369/36 |
| 5,043,962 | 8/1991 | Wanger et al. | 369/36 |
| 5,101,387 | 3/1992 | Wanger et al. | 369/36 |
| 5,184,336 | 2/1993 | Wanger et al. | 369/34 |

OTHER PUBLICATIONS

U.S. patent application Ser. No. 08/020,160 filed Feb. 18, 1993 of Luffel et al.

*Primary Examiner*—Allan D. Herrmann

[57] ABSTRACT

An integrated drive system for driving one or more elongate flexible members of a displacement apparatus used in a media handling system. The integrated drive system includes an integral housing and a plurality of shafts fixedly secured to the integral housing. A first linkage device is mounted on one of the shafts and includes a capstan, which may be adapted to receive and retain one or more elongate flexible members, and a first gear integrally formed therewith. A second linkage device is mounted on another shaft and includes a second gear which engages the first gear, and a third gear integrally formed therewith. A motor assembly may also be provided which includes a motor operatively connected to a fourth gear which engages the third gear, a motor shaft, and an overload clutch assembly which prevents the fourth gear from being rotatingly driven with the motor shaft at predetermined intervals. Methods for assembling an integrated drive system and a motor assembly are also disclosed.

11 Claims, 5 Drawing Sheets

INTEGRATED DRIVE SYSTEM

FIELD OF THE INVENTION

The present invention relates generally to drive systems used in media handling systems, and more particularly to a drive system for driving one or more elongate flexible members of a displacement apparatus used in a media handling system.

BACKGROUND OF THE INVENTION

Media handling systems are used in the computer industry for maintaining large databases which may consist of, for example, many disk or tape cartridges. Various features and components of media handling systems are disclosed in U.S. Pat. Nos. 4,998,232 dated Mar. 5, 1991 for OPTICAL DISK HANDLING APPARATUS WITH FLIP LATCH of Methlie et al.; 5,014,255 dated May 7, 1991 for OPTICAL DISK CARTRIDGE HANDLING APPARATUS WITH PASSIVE CARTRIDGE ENGAGEMENT ASSEMBLY of Wanger et al.; 5,010,536 dated Apr. 23, 1991 for CARTRIDGE HANDLING SYSTEM of Wanger et al.; 5,043,962 dated Aug. 27, 1991 for CARTRIDGE HANDLING SYSTEM of Wanger et al.; 5,101,387 dated Mar. 31, 1992 for LATERAL DISPLACEMENT CONTROL ASSEMBLY FOR AN OPTICAL DISK HANDLING SYSTEM of Wanger et al.; 5,184,336 dated Feb. 2, 1993 for LATERAL DISPLACEMENT CONTROL ASSEMBLY FOR AN OPTICAL DISK HANDLING SYSTEM of Wanger et al.; and copending U.S. patent application Ser. No. 08/020,160 filed Feb. 18, 1993 for LINEAR DISPLACEMENT AND SUPPORT APPARATUS FOR USE IN A CARTRIDGE HANDLING SYSTEM of Luffel et al., which are each hereby specifically incorporated by reference for all that is disclosed therein.

In general, a media handling system may include a storage system for storing disk or tape cartridges at corresponding storage locations. The storage locations may be arranged in a two-dimensional array consisting of a combination of vertically extending columns and horizontally extending rows. A media handling system may also include an engaging assembly for retrieving and transporting cartridges between their storage locations and media (e.g., disk or tape) drives.

To facilitate horizontal and vertical movement of the engaging assembly among the storage locations and media drives, the media handling system may further include one or more apparatuses for linearly (horizontally or vertically) displacing the engaging assembly. A linear displacement apparatus may utilize one or more elongate flexible members such as cables, ropes, belts, or chains (see, for example, copending U.S. patent application Ser. No. 08/020,160 incorporated by reference above). The elongate flexible members may be attached to the engaging assembly and mounted on pulleys, gears or the like which maintain the elongate flexible members in tension. At least one of the elongate flexible members may be engaged with and driven by a drive mechanism which causes linearly displacement of all of the elongate flexible members and the engaging assembly attached thereto. The drive mechanism may consist of a motor and a system of linkages ("gearbox") connecting the motor to one or more of the elongate flexible members.

A conventional gearbox may comprise various combinations of gears to adjust the linear displacement speed of the elongate flexible member in relation to the rotational speed of the motor. For example, to reduce the speed of the elongate flexible member in relation to the motor, a relatively small gear attached to the motor may be engaged with a relatively larger gear, which is coupled with a capstan or the like which engages the elongate flexible member. Such speed reduction may also be performed in several stages. For example, two-stage speed reduction may be accomplished by engaging a first gear, which is coupled with a capstan or the like, with a second, relatively smaller gear. The second gear is coupled with a third gear, which is engaged with a fourth gear. The fourth gear is relatively smaller than the third gear and is coupled to a motor.

SUMMARY OF THE INVENTION

The present invention may comprise an integrated drive system for driving at least one elongate flexible member of a displacement apparatus used in a media handling system. The integrated drive system may comprise an integral housing and a plurality of shafts fixedly secured to the integral housing. A first linkage device may be rotatably mounted on a first shaft. The first linkage device may comprise a capstan, which may be adapted to receive and retain at least one elongate flexible member, and a first gear integrally formed therewith. A second linkage device may be rotatably mounted on a second shaft. The second linkage device may comprise a second gear, which engages the first gear, and a third gear integrally formed therewith. A motor assembly may be provided which comprises a motor operatively connected to a fourth gear (or "motor gear"), which engages the third gear. The motor assembly may also comprise a motor shaft operatively connected to and rotatingly driven by the motor, and an overload clutch assembly which prevents the fourth gear from being rotatingly driven with the motor shaft at predetermined intervals.

The present invention may further comprise a method of assembling the integrated drive system described above. The method may comprise the steps of: (a) mounting the first linkage device on the first shaft; (b) mounting the second linkage device on the second shaft, allowing the first gear of the first linkage device and the second gear of the second linkage device to be engaged; (c) passing at least a portion of the motor assembly through an opening in the integral housing, allowing the third gear of the second linkage device and the fourth gear of the motor assembly to be engaged; and (d) securing the motor assembly to the integral housing.

The present invention may further comprise a method of assembling the motor assembly described above. The method may comprise the steps of: (a) mounting a biasing device on the motor shaft; (b) mounting a laterally extending plate and the fourth gear attached thereto on the motor shaft, the fourth gear being adjacent to the biasing device; (c) compressing the biasing device while passing the pin laterally through a bore in the motor shaft; and (d) aligning the pin with at least one groove in the laterally extending plate.

It will be appreciated that the present invention provides a complete drive system which allows for easy integration. The feature-rich integral housing provides highly accurate referencing for the media handling system by providing referencing for all of the internal drive components (linkage devices and motor gear), a hardstop reference for the engaging assembly, and references to the housing of the media handling system. The integral housing also provides a shield about the capstan diameter that retains the elongate flexible member in its proper wraps during dynamic loading and assembly. The overload clutch assembly is integral to the motor assembly of the drive system and provides protection to the motor gear and linkage devices during dynamic loading at a very low cost. The components of the integrated drive system are easily and quickly assembled, the integral housing snaps together, and mounting the integrated drive system to the media handling system requires only one screw. Overall, the integrated drive system is only a fraction of the cost of off-the-shelf subassemblies (gearboxes, motors, etc.), and the integral housing alone provides many features that would have to be added to an off-the-shelf solution.

BRIEF DESCRIPTION OF THE DRAWINGS

Illustrative and presently preferred embodiments of the invention are shown in the accompanying drawings in which.

DETAILED DESCRIPTION OF THE INVENTION

Media Handling System

Figure 1:
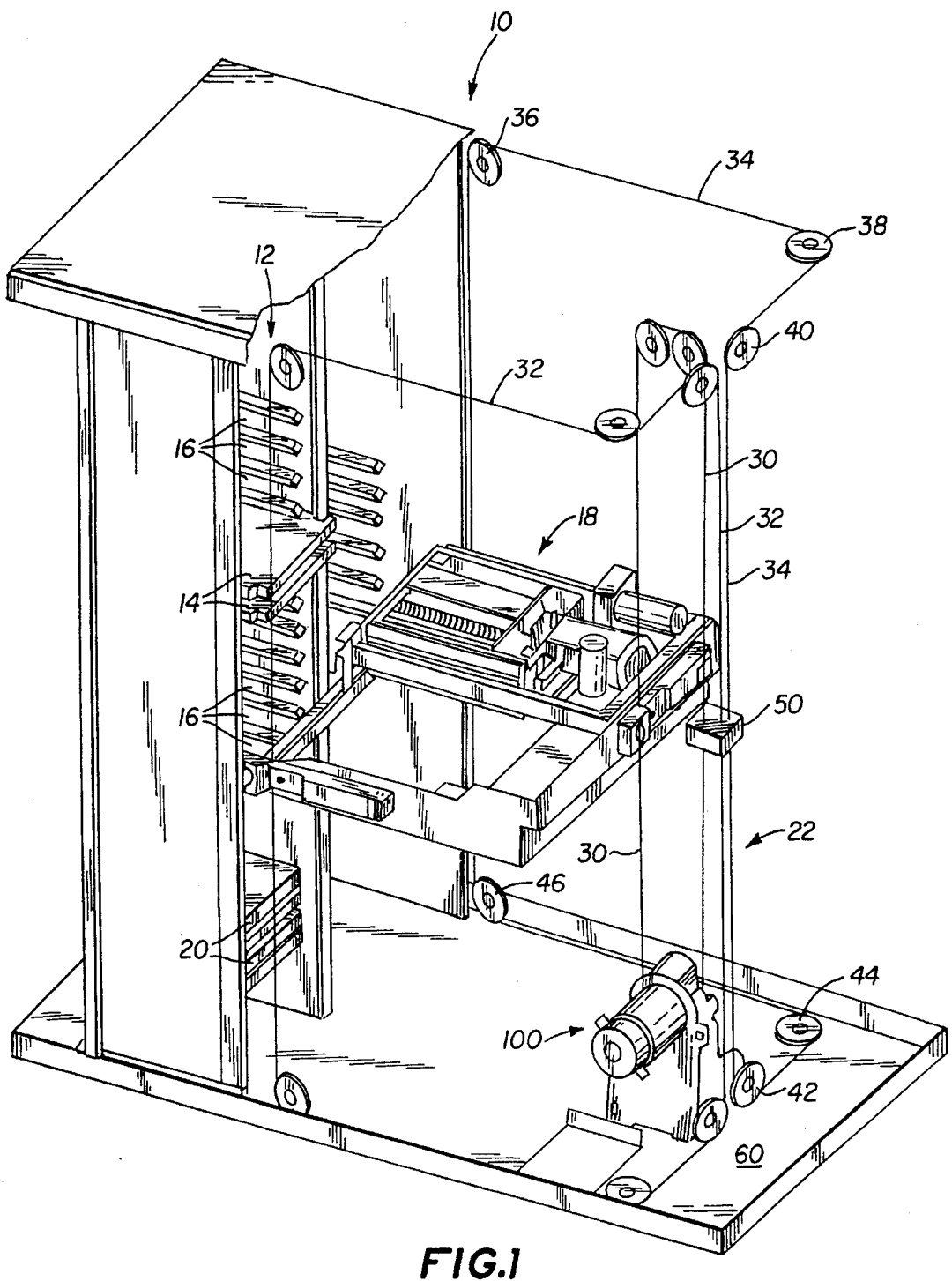
FIG. 1 is a schematic perspective view of a media handling system utilizing the integrated drive system of the present invention.

FIG. 1 illustrates an exemplary media handling system 10 utilizing the integrated drive system 100 of the present invention. It is to be understood that the media handling system 10 described below is included herein for illustrative purposes only, and that other media handling systems may also utilize the integrated drive system 100 of the present invention.

With reference to FIG. 1, a media handling system 10 may include a storage system 12 for storing disk or tape cartridges 14 at corresponding storage locations 16. A media handling system 10 may also include an engaging assembly 18 for retrieving and transporting cartridges 14 between their storage locations 16 and media (e.g., disk or tape) drives 20. The cartridges 14 and media drives 20 may be arranged in a two-dimensional array consisting of vertically extending columns and horizontally extending rows as shown in FIG. 1.

To move the engaging assembly 18 vertically and horizontally among the storage locations 16 and media drives 20, the media handling system 10 may also comprise one or more linear displacement apparatuses such as the vertical displacement apparatus 22 shown in FIG. 1. A linear displacement apparatus may utilize one or more elongate flexible members such as cables, ropes, belts or chains, which are placed under tension and motor-driven in order to displace the engaging assembly 18. The vertical displacement apparatus 22 of the media handling system 10 shown in FIG. 1 utilizes three elongate flexible members 30, 32, 34 for displacing the engaging assembly 18. The elongate flexible members 30, 32, 34 are each attached to the engaging assembly 18 and are tensioned by mounting the elongate flexible members 30, 32, 34 on pulleys (e.g., 36, 38, 40, 42, 44, 46 associated with flexible member 34). One of the elongate flexible members 30 is engaged with the integrated drive system 100 of the present invention, which will be described in further detail below. The elongate flexible members 30, 32, 34 are attached together with one or more couplers 50 or the like so that they are driven together at the same rate of speed. The media handling system 10 may be enclosed within a housing 60.

Integrated Drive System In General

Figure 2:
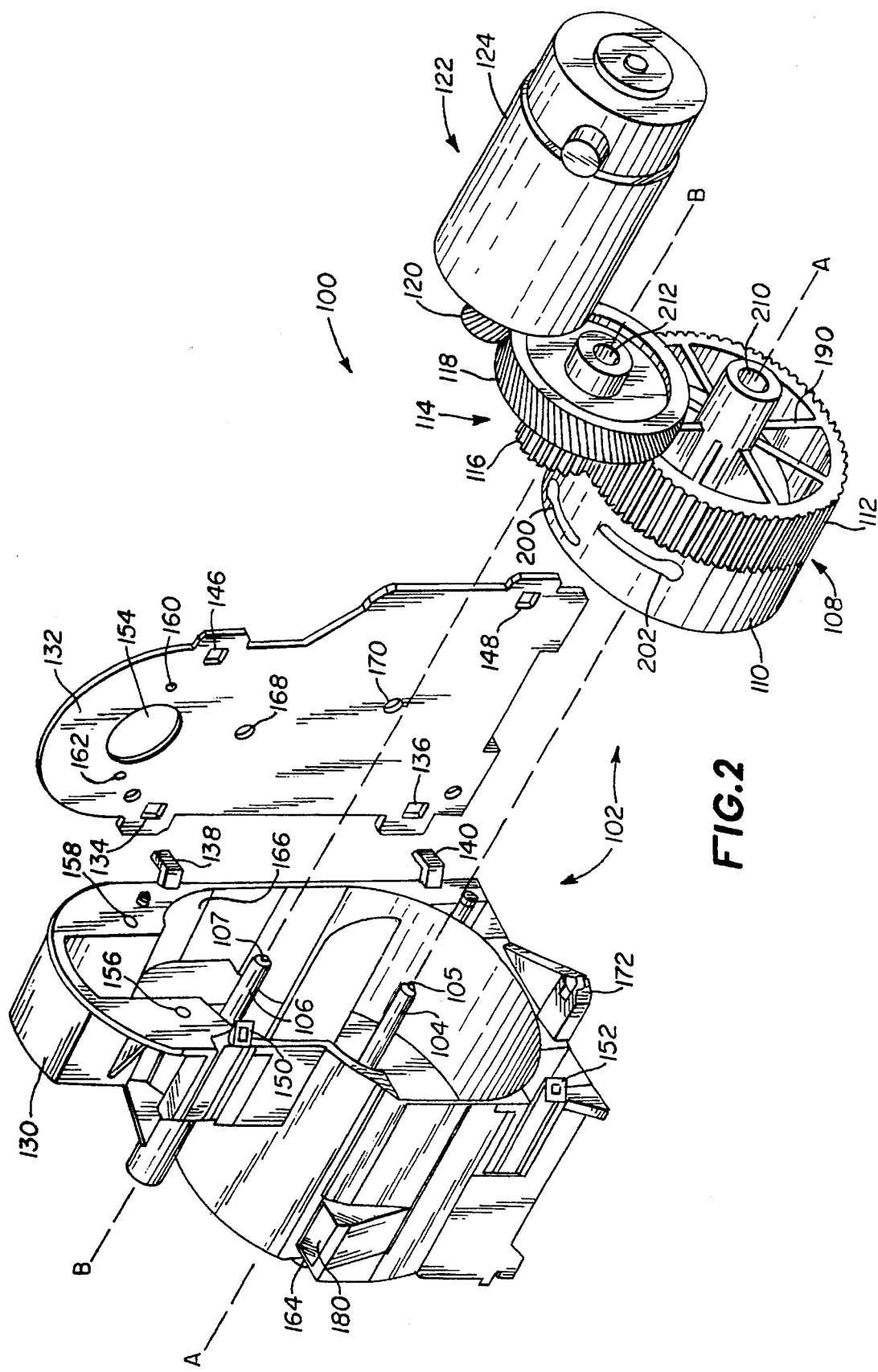
FIG. 2 is an exploded view of the integrated drive system of FIG. 1.
Figure 3:
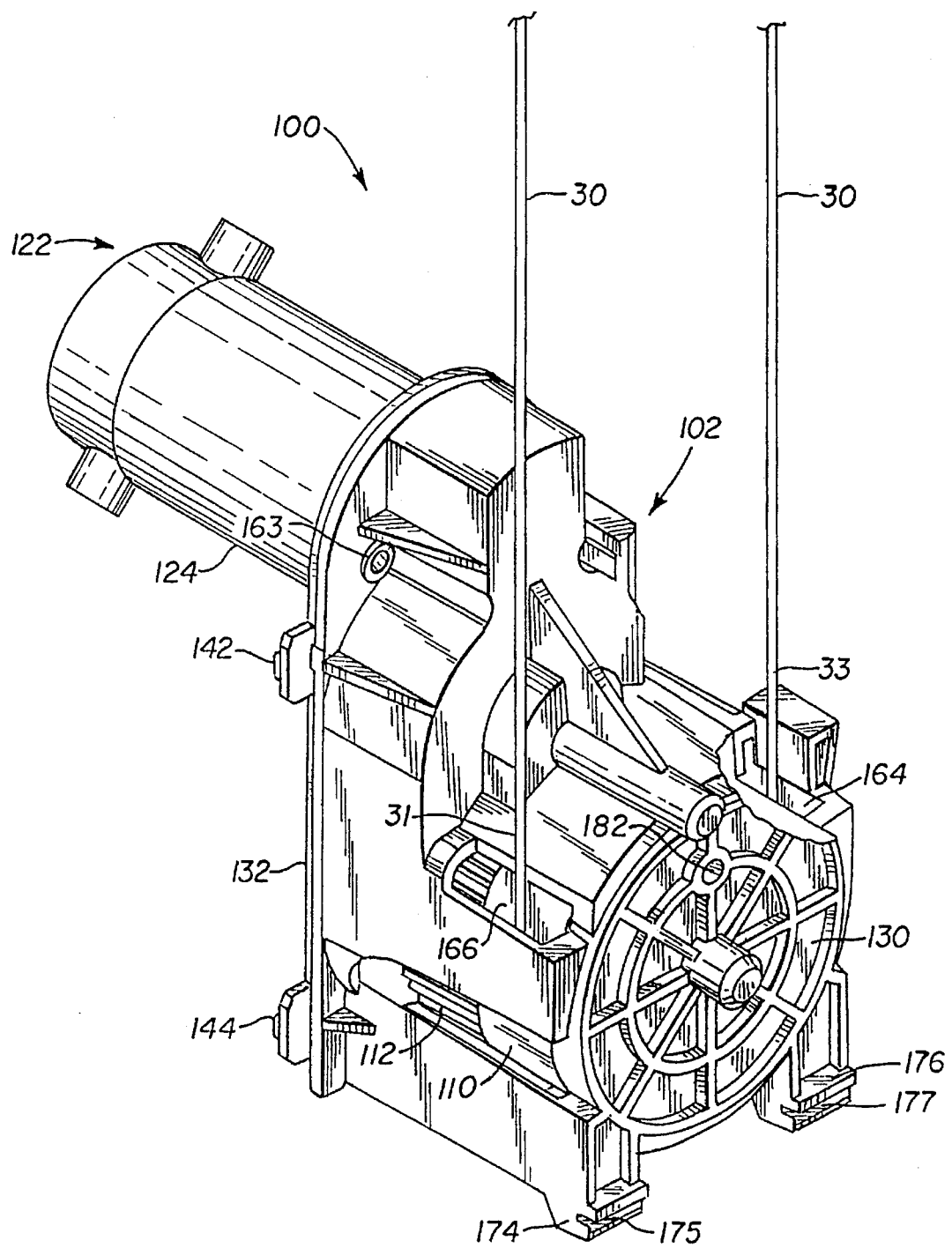
FIG. 3 is a rear perspective view of the integrated drive system of FIG. 1.

The integrated drive system 100 may be used for driving at least one elongate flexible member (e.g., 30) of a displacement apparatus (e.g., 22) used in a media handling system (e.g., 10). As shown in FIGS. 2 and 3, the integrated drive system 100 may comprise an integral housing 102 and a plurality of shafts 104, 106 fixedly secured to the integral housing 102. A first linkage device 108 may be mounted on a first shaft 104. The first linkage device 108 may include a capstan 110, which may be adapted to receive and retain at least one elongate flexible member (e.g., 30), and a first gear 112 integrally formed therewith. A second linkage device 114 may be mounted on a second shaft 106. The second linkage device 114 may include a second gear 116, which engages the first gear 112, and a third gear 118 integrally formed therewith. A motor assembly 122 may be provided which comprises a motor 124 operatively connected to a fourth (motor) gear 120, which engages the third gear 118.

The integrated drive system 100 having thus been described in general, specific features thereof will now be described in more detail.

Integral Housing

The integral housing 102 may be comprised of an integrally-formed housing member 130 and a housing cover 132 which is displaceable relative to the integrally-formed housing member 130. The integrally-formed housing member 130 and the housing cover 132 may each be manufactured from, e.g., polycarbonate using a conventional plastic injection molding process.

As shown in FIG. 2, the housing cover 132 may comprise first and second openings 134, 136 which receive first and second protrusions 138, 140 on the integrally-formed housing member 130 to form hinges 142, 144, FIG. 3. The housing cover 132 may also comprise third and fourth openings 146, 148 which receive third and fourth protrusions 150, 152 to snap the housing cover 132 in place on the integrally-formed housing member 130 and form the integral housing 102 as shown in FIG. 3. The housing cover 132 may be adapted to be completely removable from the integrally-formed housing member 130 as shown in FIG. 2. In an alternative embodiment (not shown), the housing cover 132 may be rotatably, nonremovably attached to the integrally-formed housing member 130 at the hinges 142, 144, FIG. 3.

The integral housing 102 may further comprise a motor-receiving opening 154, preferably within the housing cover 132 as shown in FIG. 2, which may receive a portion of the motor 124 as described in further detail below with respect to assembling the integrated drive system 100. The motor-receiving opening 154 serves as a reference for the motor gear 120 in relation to the other internal components (e.g., the first and second linkage devices 108, 114). The integral housing 102 may also comprise motor mounting portions 156, 158 (preferably within the integrally-formed housing member 130) and 160, 162 (preferably within the housing cover 132) which may receive screws 163 (FIG. 3, only one shown) or the like to secure the motor 124 to the housing 102 after the housing cover 132 has been snapped in place on the integrally-formed housing member 130.

The integral housing 102 may further comprise first and second flexible member-receiving openings 164, 166, preferably within the integrally-formed housing member 130 as shown in FIG. 3, through which one or more elongate flexible members 30 may pass. The integral housing 102 may also comprise a plurality of shaft-receiving openings 168, 170, preferably within the housing cover 132 as shown in FIG. 2, through which the ends 105, 107, respectively, of the shafts 104, 106 may pass. The shaft-receiving openings 168, 170 initially locate the shafts 104, 106 and maintain alignment thereof while the housing cover 132 is in place on the integrally-formed housing member 130.

The integral housing 102 may further comprise drive system mounting portions 172, FIG. 2, and 174, 176, FIG. 3, for securing the integrated drive system 100 to the housing 60, FIG. 1, of the media handling system 10 as well as providing referencing to the housing 60 of the media handling system 10. The first drive system mounting portion 172, FIG. 2, may receive a screw (not shown) or the like to secure the integrated drive system 100 to the housing 60, FIG. 1. The second and third drive system mounting portions 174, 176, FIG. 3, may comprise slots 175, 177, respectively, which grasp a portion (e.g., a plate, not shown) of the housing 60, FIG. 1.

The integral housing 102 may further comprise an engaging assembly hardstop 180 which provides a vertical reference for the engaging assembly 18 in relation to the housing 60, and hence the storage system 12, of the media handling system 10.

The integral housing 102 may further comprise a tool access hole 182, FIG. 3, which may be utilized during servicing or assembly of the media handling system 10, FIG. 1, to lock the engaging assembly 18 at various heights. A tool (not shown) such as a screwdriver may be inserted through the hole 182, FIG. 3, and rested against a rib 190, FIG. 2, on the first linkage device 108 to prevent the first linkage device 108 from rotating.

Shafts and Linkage Devices

The shafts 104, 106 are preferably manufactured from stainless steel and may be nonremovably inserted into the integrally-formed housing member 130 during plastic injection molding thereof. The first shaft 104 defines a first rotation axis AA and the second shaft 106 defines a second rotation axis BB. It will be appreciated that insert-molding the shafts 104, 106 within the integrally-formed housing member 130 constrains the shafts 104, 106 axially as well as prevents the shafts 104, 106 from rotating around their axes AA, BB, respectively. This allows the ends 105, 107, respectively, of the shafts 104, 106 to be very simply supported. As described above, the ends 105, 107 of the shafts 104, 106 pass through shaft-receiving openings 168, 170 within the housing cover 132 which initially locate the shafts 104, 106 and maintain alignment thereof while the housing cover 132 is in place on the integrally-formed housing member 130. This configuration provides referencing for the first and second linkage devices 108, 114.

The first linkage device 108 is comprised of the capstan 110 and the first gear 112 which may be integrally formed from an internally lubricated plastic material such as polycarbonate/PTFE by plastic injection molding or the like. It should be noted that the use of an internally lubricated plastic material eliminates the need for external lubricants such as grease or oil, which eliminates the need to completely seal the integral housing 102 in order to prevent contamination of external lubricants. Furthermore, integrally forming the capstan 110 with the first gear 112 eliminates the need for a separate coupler device between the capstan 110 and the first gear 112, thereby reducing the number of components as well as eliminating the assembly steps required to join the capstan 110 with the first gear 112.

The capstan 110 and first gear 112 may comprise a common continuous bore 210 which receives the first shaft 104. The capstan 110 and first gear 112 are rotatable around rotation axis AA. To reduce friction caused by rotation of the capstan 110 and first gear 112, needle bearings (not shown) or the like may be inserted between the bore 210 and the first shaft 104. The first gear 112 comprises "$N_1$" number of teeth. The first gear 112 is shown in FIG. 2 to be a straight (nonhelical) gear, but it is to be understood that the first gear 112 may be of another type (e.g., helical).

The capstan 110 may be adapted to receive and retain at least one elongate flexible member (e.g., 30, FIG. 3). Specifically, the capstan 110 may comprise a plurality of keyhole portions 200, 202, FIG. 2, which are each adapted to receive and retain a ball-shaped end portion (not shown) of an elongate flexible member 30, FIG. 3, such as a cable. The elongate flexible member 30 may be wrapped around the capstan 110 as desired and exits the integral housing 102 through the flexible member-receiving openings 164, 166, FIG. 3. It will be appreciated that the keyhole portions 200, 202, FIG. 2, securely hold the elongate flexible member 30 as well as provides guidance for wrapping the elongate flexible member 30 around the capstan 110.

With reference to FIGS. 2 and 3, as the first linkage device 108, FIG. 2, rotates around rotation axis AA, one end portion (e.g., 31, FIG. 3) of the flexible member 30 is taken up by the capstan 110 at a particular rate, while the opposite end portion (e.g., 33) of the flexible member 30 is unwrapped from the capstan 110 at the same rate.

The second linkage device 114 is comprised of the second gear 116 and the third gear 118 which may be integrally formed from an internally lubricated plastic material such as nylon/PTFE by plastic injection molding or the like. Integrally forming the second gear 116 with the third gear 118 eliminates the need for a separate coupler between the second and third gears 116, 118, thereby reducing the number of components as well as eliminating the assembly steps required to join the second and third gears 116, 118. The second and third gears 116, 118 preferably comprise a common continuous bore 212 which receives the second shaft 106. The second and third gears 116, 118 are rotatable around rotation axis BB. To reduce friction caused by rotation of the second and third gears 116, 118, needle bearings (not shown) or the like may be inserted between the bore 212 and the second shaft 106.

The second gear 116 engages the first gear 112 and thus is of a corresponding type (e.g., straight). The second gear 116 comprises "$N_2$" number of teeth, wherein $N_2<N_1$. The third gear 118 comprises "$N_3$" number of teeth. In FIG. 2, the second gear 116 is shown to be smaller than the third gear 118. However, the second gear 116 may alternatively be larger than or the same size as the third gear 118. In order to reduce noise, the third gear 118 may be a helical gear as shown in FIG. 2, but it is to be understood that the third gear 112 may be of another type (e.g., straight). It should be noted that while helical gears generally develop thrust loads, internally lubricated plastic gears such as the third gear 118 have sufficiently low wear to serve as their own thrust bearings.

The fourth gear 120 engages the third gear 118 and thus is of a corresponding type (e.g., helical). The fourth gear 120 may be manufactured from stainless steel, or, alternatively, formed from an internally lubricated plastic material such as polycarbonate/PTFE by plastic injection molding or the like. The fourth gear 120 is operatively connected to the motor assembly 122, which is discussed in more detail below. The fourth gear 120 comprises "$N_4$" number of teeth, wherein $N_4<N_3$.

In a preferred embodiment of the invention, the integrated drive system 100 performs a two-stage reduction of the linear displacement speed of the elongate flexible member 30 in relation to the rotational speed of the motor 124. In one alternative embodiment (not shown), the integrated drive system 100 may perform such speed reduction in a single-stage, which would eliminate the need for the second shaft 106, and the second linkage device 114. In this embodiment, the first gear 112 engages the fourth gear 120. In another alternative embodiment, the integrated drive system 100 may perform such speed reduction in three or more stages, which may require additional gears and shafts (not shown).

Motor Assembly

Figure 4:
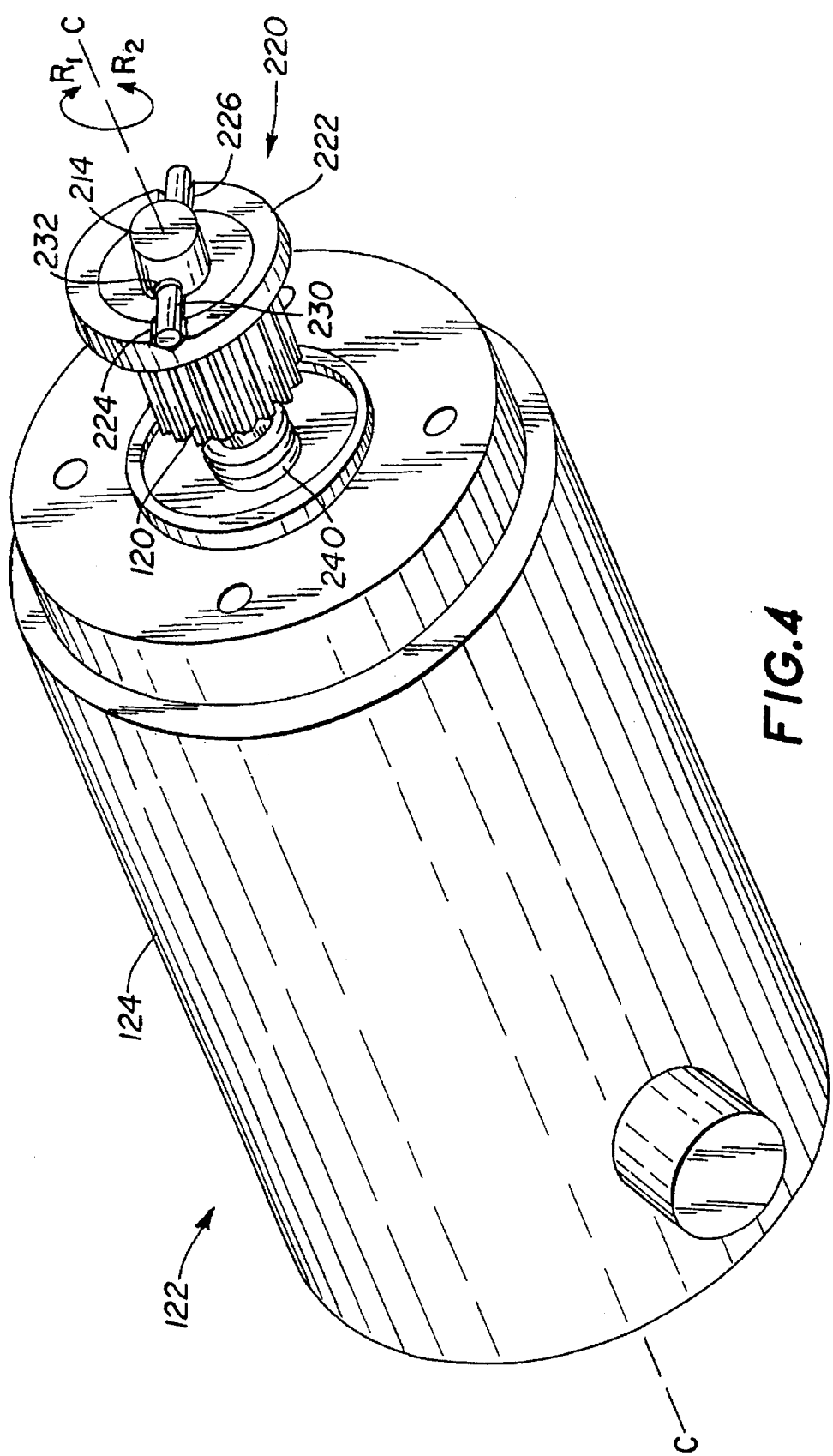
FIG. 4 is a perspective view of a motor assembly of the integrated drive system of FIG. 1.

The motor assembly 122, FIG. 4, may comprise a reversible electric motor 124 which rotatably drives a shaft 214 around a third rotation axis CC. The fourth gear 120 may be mounted on the shaft 214 and rotatable therewith around axis CC.

The motor assembly 122 may also comprise an overload clutch assembly 220 which prevents the fourth gear 120 from being rotatingly driven with the shaft 214 at predetermined intervals, e.g., when the engaging assembly 18 (FIG. 1) "crashes," in order to avoid damage to the teeth of the first, second, third and fourth gears 112, 116, 118, 120, respectively. The engaging assembly 18 may "crash," for example, into a cartridge 14 (FIG. 1) which is not correctly seated in its storage location 16 (FIG. 1) and which extends into the vertical path of travel of the engaging assembly 18. As another example, the engaging assembly 18 may "crash" into the top or bottom of the media handling system housing 60 (FIG. 1). Thus, the overload clutch assembly 220 provides protection during dynamic loading.

As shown in FIG. 4, the overload clutch assembly 220 may comprise a laterally extending plate 222 fixedly attached to the fourth gear 120 and rotatable therewith. The laterally extending plate 222 may comprise at least one groove, e.g., 224, 226. The laterally extending plate 222 most preferably comprises two diametrically opposed, V-shaped grooves 224, 226 as shown in FIG. 4. The overload clutch assembly 220 may also comprise a pin 230 which is passed laterally through a bore 232 in the shaft 214 and is engageable with the grooves 224, 226 in the laterally extending plate 222. The overload clutch assembly 220 may further comprise a biasing device 240 mounted on the shaft 214 between the motor 124 and the fourth gear 120. The biasing device 240 is in a compressed state when the pin 230 is positioned within the bore 232 in the shaft 214. In a compressed state, the biasing device 240 exerts biasing force on the fourth gear 120 toward the pin 230 in order to maintain the pin 230 within the grooves 224, 226 in the laterally extending plate 222 when the motor 124 is not overloaded, i.e., during normal operation of the motor 124.

Figure 5:
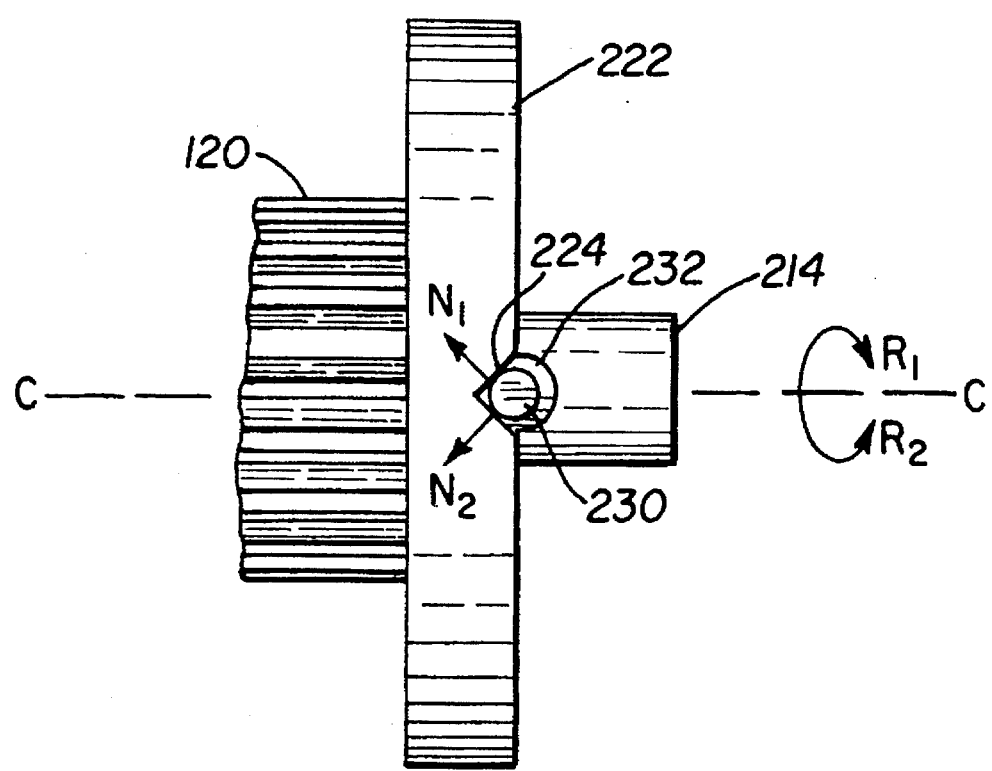
FIG. 5 is an enlarged portion of the motor assembly of FIG. 4.

Referring to FIG. 5, when the shaft 214 rotates in a first direction "$R_1$" the pin 230 exerts a force "$N_1$" on the V-shaped groove 224 (and a corresponding force on the opposite V-shaped groove 226, FIG. 4) which causes the laterally extending plate 222 and fourth gear 120 to rotate with the shaft 214 in direction "$R_1$". When the shaft 214 rotates in a second direction "$R_2$", the pin 230 exerts a force "$N_2$" on the V-shaped groove 224 (and a corresponding force on the opposite V-shaped groove 226, FIG. 4) which causes the laterally extending plate 222 and fourth gear 120 to rotate with the shaft 214 in direction "$R_2$". During normal operation when a component of each force "$N_1$" and "$N_2$" parallel to the axis CC of the shaft 214 is less than a predetermined overload force "F", the motor assembly 122 will remain in an engaged operating state wherein the pin 230 is engaged with each V-shaped groove 224, 226, as shown in FIG. 4. In an engaged operating state, the laterally extending plate 222 and the fourth gear 120 attached thereto may be rotatingly driven with the shaft 214 by the motor 124. When a component of each force "$N_1$" and "$N_2$" parallel to axis CC is equal to or larger than the predetermined overload force "F", such as when rotation of the fourth gear 120 is impeded as discussed above, the pin 230 will slip out of each V-shaped groove 224, 226 as the laterally extending plate 222 and fourth gear 120 move along axis CC, placing the motor assembly 122 in a disengaged operating state. In a disengaged operating state, the laterally extending plate 222 and the fourth gear 120 are prevented from being rotatingly driven with the shaft 214, i.e., the shaft 214 may continue to rotate without causing the laterally extending plate 222 and fourth gear 120 to rotate. The amount of overload force "F" required to displace the pin 230 from the grooves 224, 226 is dependent upon such factors as the shape and angle of the grooves, biasing force of the biasing device 240, and frictional coefficient between the pin 230 and the grooves 224, 226.

To assemble the motor assembly 122, FIG. 4, the biasing device 240 is first mounted on the motor shaft 214. Next, the laterally extending plate 222 and fourth ear 120 attached thereto are mounted on the motor shaft 214, the fourth gear 120 being adjacent to the biasing device 240. The biasing device 240 is then compressed by, for example, applying force to the laterally extending plate 222, to expose the laterally extending bore 232 in the shaft 214, while the pin 230 is passed through the bore 232. Finally, the laterally extending plate 222 and fourth gear 120 attached thereto are rotated as necessary until the pin 230 aligns with and engages the V-shaped grooves 224, 226.

Assembling the Integrated Drive System

With reference to FIG. 2, a method for assembling the integrated drive system 100 will now be described. The first linkage device 108 is mounted on the first shaft 104, and the second linkage device 114 is mounted on the second shaft 106. The second gear 116 of the second linkage device 114 engages the first gear 112 of the first linkage device 108. The housing cover 132 may then be aligned with the integrally-formed housing member 130, and the shafts 104, 106 may be passed through the shaft-receiving openings 168, 170 on the housing cover 132. The housing cover 132 may then be removably secured in place on the integrally-formed housing member 130 to form the integral housing 102 (FIG. 3). A portion of the motor assembly 122 may be passed through the motor-receiving opening 154 in the housing cover 132 such that the fourth gear 120 engages the third gear 118 and the motor 124 remains outside of the integral housing 102. The motor assembly 122 may then be secured to the integral housing 102 by attaching the motor 124 with screws (not shown) or the like to the integral housing 102 at the motor mounting portions 156, 158, 160, 162.

The assembled integrated drive system 100 may be secured with a screw (not shown) or the like to the housing 60 of the media handling system 10 (FIG. 1) at the drive system mounting portion 172 (FIG. 2). The integrated drive system 100 may then be connected to a linear displacement apparatus such as the vertical displacement apparatus 22 shown in FIG. 1. In particular, at least one elongate flexible member 30 (FIGS. 1 and 3) of the vertical displacement apparatus 22 (FIG. 1) may be passed through the flexible member-receiving openings 164, 166 (FIG. 3) in the integral housing 102 and attached to the capstan 110 (FIG. 2). Alternatively, attaching one or more elongate flexible members 30 may be accomplished contemporaneously with the step of mounting the first linkage device 108 on the first shaft 104. Specifically, an elongate flexible member 30 may be attached to the capstan 110 and passed through one of the flexible member-receiving openings (e.g., 164). A second elongate flexible member 30 may also be attached to the capstan 110 and passed through the second flexible member-receiving opening (e.g., 166). The subsequent steps may then be performed as described above.

Other Embodiments of the Invention

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. An integrated drive system for driving at least one elongate flexible member of a displacement apparatus used in a media handling system, comprising:

a) an integral housing;

b) a plurality of shafts fixedly secured to said integral housing;

c) a first linkage device rotatably mounted on a first one of said plurality of shafts, said first linkage device comprising a capstan and a first gear integrally formed therewith, said capstan being adapted to receive and retain said at least one elongate flexible member of said displacement apparatus;

d) a second linkage device rotatably mounted on a second one of said plurality of shafts, said second linkage device comprising a second gear and a third gear integrally formed therewith, said second gear being engaged with said first gear; and e) a motor assembly comprising a motor operatively connected to a fourth gear which is engaged with said third gear.

2. The invention of claim 1 wherein said integral housing comprises an integrally-formed housing member and a housing cover which is displaceable relative to said integrally-formed housing member.

3. The invention of claim 1 wherein at least a portion of said motor assembly passes through an opening in said integral housing and said motor assembly is removably secured to said integral housing.

4. The invention of claim 1 wherein each of said plurality of shafts passes through openings in said integral housing.

5. The invention of claim 1 wherein said motor assembly further comprises a motor shaft operatively connected to said motor and rotatingly driven thereby and an overload clutch assembly which prevents said fourth gear from being rotatingly driven with said motor shaft at predetermined intervals, said overload clutch assembly comprising:

a) a laterally extending plate fixedly attached to said fourth gear and rotatable therewith, said laterally extending plate comprising at least one groove, wherein said laterally extending plate and said fourth gear are mounted on said motor shaft;

b) a pin passing laterally through said motor shaft and engageable with said at least one groove of said laterally extending plate; and c) a biasing device mounted on said motor shaft between said motor and said fourth gear, wherein said biasing device exerts biasing force on said fourth gear toward said pin in order to maintain said pin within said at least one groove of said laterally extending plate.

6. The invention of claim 5 further comprising:

a) an engaged operating state wherein said pin is engaged with said at least one groove which causes said laterally extending plate and said fourth gear attached thereto to be rotatingly driven with said motor shaft; and b) a disengaged operating state wherein said pin is disengaged from said at least one groove to prevent said fourth gear from being rotatingly driven with said motor shaft.

7. A method of assembling an integrated drive system for a displacement apparatus used in a media handling system, said integrated drive system comprising an integral housing, a plurality of shafts fixedly secured to said integral housing, a first linkage device comprising a capstan and a first gear integrally formed therewith; a second linkage device comprising a second gear and a third gear integrally formed therewith, and a motor assembly comprising a motor and a fourth gear, said method comprising the steps of:

a) mounting said first linkage device on a first one of said plurality of shafts;

b) mounting said second linkage device on a second one of said plurality of shafts, allowing said first gear of said first linkage device and said second gear of said second linkage device to be engaged;

c) passing at least a portion of said motor assembly through an opening in said integral housing, allowing said third gear of said second linkage device and said fourth gear of said motor assembly to be engaged; and d) securing said motor assembly to said integral housing.

8. The method of claim 7 wherein said integral housing comprises an integrally-formed housing member and a housing cover which is displaceable relative to said integrally-formed housing member, said method further comprising the step of:

a) prior to the step of passing at least a portion of said motor assembly through an opening in said integral housing, aligning said housing cover with said integrally-formed housing member and securing said housing cover to said integrally-formed housing member.

9. The method of claim 7 wherein said displacement apparatus of said media handling system comprises at least two elongate flexible members, further comprising the step of:

a) contemporaneously with the step of mounting said first linkage device on a first one of said plurality of shafts, securely attaching each of said elongate flexible members to said capstan and passing each of said elongate flexible members through an opening in said integral housing.

10. The method of claim 7 wherein said displacement apparatus of said media handling system comprises at least one elongate flexible member, further comprising the step of:

a) passing said elongate flexible member through at least one opening in said integral housing and securely attaching said elongate flexible member to said capstan.

11. A method of assembling a motor assembly comprising a motor shaft operatively connected to a motor and rotatingly driven thereby, a pin, a biasing device, and a laterally extending plate fixedly attached to a fourth gear and rotatable therewith, said laterally extending plate comprising at least one groove, said method comprising the steps of:

a) mounting said biasing device on said motor shaft;

b) mounting said laterally extending plate and said fourth gear on said motor shaft, said fourth gear being adjacent to said biasing device;

c) compressing said biasing device while passing said pin laterally through a bore in said motor shaft; and d) aligning said pin with said at least one groove in said laterally extending plate.

* * * * *